(12) United States Patent
Jalali (10) Patent No.: US 10,103,803 B2
(45) Date of Patent: *Oct. 16, 2018

(54) GROUND TERMINAL AND GATEWAY BEAM POINTING TOWARD AN UNMANNED AERIAL VEHICLE (UAV) FOR NETWORK ACCESS

(71) Applicant: Bridgewest Finance LLC, San Diego, CA (US)

(72) Inventor: Ahmad Jalali, San Diego, CA (US)

(73) Assignee: Bridgewest Finance LLC, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/451,126

(22) Filed: Mar. 6, 2017

(65) Prior Publication Data

US 2017/0180035 A1 Jun. 22, 2017

Related U.S. Application Data

(63) Continuation of application No. 14/711,427, filed on May 13, 2015, now Pat. No. 9,590,720.

(51) Int. Cl.
*B64C 39/02* (2006.01)
*H04B 7/185* (2006.01)

(52) U.S. Cl.
CPC ....... *H04B 7/18504* (2013.01); *B64C 39/024* (2013.01); *B64C 2201/122* (2013.01)

(58) Field of Classification Search
CPC .......................... B64C 2201/00; B64C 39/024
(Continued)

(56) References Cited

U.S. PATENT DOCUMENTS

| | | |
|---|---|---|
| 3,568,197 A | 3/1971 | Harold |
| 3,780,303 A | 12/1973 | Smith et al. |
| 3,891,985 A | 6/1975 | Oigarden et al. |
| 4,209,695 A | 6/1980 | Arnold et al. |
| 4,278,885 A | 7/1981 | Von Alfthan et al. |
| 4,317,993 A | 3/1982 | Hertzog, Jr. et al. |
| 4,365,154 A | 12/1982 | Arnold et al. |
| 4,387,302 A | 6/1983 | Givens |
| 4,499,380 A | 2/1985 | Aggour et al. |
| 4,851,687 A | 7/1989 | Ettinger et al. |
| 5,021,664 A | 6/1991 | Hinshaw |
| 5,068,532 A | 11/1991 | Wormald et al. |
| 5,076,993 A | 12/1991 | Sawa et al. |
| 5,098,640 A | 3/1992 | Gozani et al. |

(Continued)

FOREIGN PATENT DOCUMENTS

| | | |
|---|---|---|
| CA | 2316440 A1 | 2/2001 |
| EP | 2369361 A1 | 9/2011 |

(Continued)

OTHER PUBLICATIONS

Abbott H., et al., "Land-Vehicle Navigation Using GPS" Proceedings of the IEEE, 1999, vol. 87(1), pp. 145-162.

(Continued)

*Primary Examiner* — John J Lee
(74) *Attorney, Agent, or Firm* — Klein, O'Neill & Singh, LLP (57) ABSTRACT

Systems and methods for detecting an unmanned aerial vehicle (UAV). Network access (for example, to the Internet) may be provided by detecting a UAV and fixing one or more beams from one or more ground terminals to the UAV. In one embodiment, the detection of a UAV includes forming and pointing beams from a ground terminal and ground gateways toward the UAV. The ground terminal may be configured to autonomously steer its antenna beam during initial installation to detect the reference signal from a UAV. In one variant, the ground terminals are steered to more finely track the position of the UAV based on a signal quality metric such as received signal strength. In one embodiment, the ground terminal antenna is initially manually pointed toward the UAV, and thereafter allowed to automatically steer to track the position of the UAV.

6 Claims, 7 Drawing Sheets

(58) Field of Classification Search
USPC .............. 455/419, 420, 434, 515, 431, 67.11
See application file for complete search history.

(56) References Cited

U.S. PATENT DOCUMENTS

| | | |
|---|---|---|
| 5,239,568 A | 8/1993 | Grenier |
| 5,241,544 A | 8/1993 | Jasper et al. |
| 5,521,817 A | 5/1996 | Burdoin et al. |
| 5,561,434 A | 10/1996 | Yamazaki |
| 5,712,885 A | 1/1998 | Sowerby et al. |
| 5,832,379 A | 11/1998 | Mallinckrodt |
| 5,995,494 A | 11/1999 | Horikawa |
| 6,018,659 A | 1/2000 | Ayyagari et al. |
| 6,034,634 A | 3/2000 | Karlsson et al. |
| 6,044,323 A | 3/2000 | Yee et al. |
| 6,061,562 A | 5/2000 | Martin et al. |
| 6,108,538 A | 8/2000 | Blasiak et al. |
| 6,144,032 A | 11/2000 | Gazdzinski |
| 6,256,476 B1 | 7/2001 | Beamish et al. |
| 6,281,838 B1 | 8/2001 | Hong |
| 6,513,758 B1 | 2/2003 | Lloyd |
| 6,594,509 B1 | 7/2003 | Takakusaki et al. |
| 6,628,941 B2 | 9/2003 | Knoblach et al. |
| 6,718,161 B1 | 4/2004 | Westall et al. |
| 6,756,937 B1 | 6/2004 | Chang et al. |
| 6,856,803 B1 | 2/2005 | Gross et al. |
| 6,873,301 B1 | 3/2005 | Lopez |
| 7,095,376 B1 | 8/2006 | Timothy et al. |
| 7,212,170 B1 | 5/2007 | Dean et al. |
| 7,777,674 B1 | 8/2010 | Haddadin et al. |
| 8,078,162 B2 | 12/2011 | Deaton et al. |
| 8,116,763 B1 | 2/2012 | Olsen |
| 8,183,999 B1 | 5/2012 | Giallorenzi et al. |
| 8,190,147 B2 | 5/2012 | Kauffman et al. |
| 8,558,734 B1 | 10/2013 | Piesinger |
| 8,897,770 B1 | 11/2014 | Frolov et al. |
| 9,100,086 B1 | 8/2015 | Olsen |
| 9,119,179 B1 | 8/2015 | Firoiu et al. |
| 9,488,981 B2 | 11/2016 | Pillai et al. |
| 9,590,720 B2 | 3/2017 | Jalali |
| 2002/0061730 A1 | 5/2002 | Hart et al. |
| 2002/0168974 A1 | 11/2002 | Rosen et al. |
| 2003/0040274 A1 | 2/2003 | Dai et al. |
| 2003/0095067 A1 | 5/2003 | Howell |
| 2003/0223354 A1 | 12/2003 | Olszewski |
| 2004/0038658 A1 | 2/2004 | Gurelli et al. |
| 2004/0152480 A1 | 8/2004 | Willars et al. |
| 2005/0035897 A1 | 2/2005 | Perl et al. |
| 2005/0107077 A1 | 5/2005 | Hintermeier et al. |
| 2005/0108374 A1 | 5/2005 | Pierzga et al. |
| 2005/0143005 A1 | 6/2005 | Moore |
| 2005/0243005 A1 | 11/2005 | Rafi et al. |
| 2005/0264438 A1* | 12/2005 | Fullerton ............ G01S 13/0209 342/28 |
| 2006/0009262 A1 | 1/2006 | Hamm |
| 2006/0063566 A1 | 3/2006 | Maruta |
| 2006/0238411 A1 | 10/2006 | Fullerton et al. |
| 2007/0032246 A1 | 2/2007 | Feher |
| 2007/0090990 A1 | 4/2007 | Nelson |
| 2007/0184849 A1 | 8/2007 | Zheng |
| 2007/0224931 A1 | 9/2007 | Fitton et al. |
| 2007/0230419 A1 | 10/2007 | Raman et al. |
| 2007/0281705 A1 | 12/2007 | Bosenbecker |
| 2008/0090606 A1 | 4/2008 | Hwang et al. |
| 2008/0117858 A1 | 5/2008 | Kauffman |
| 2008/0233865 A1 | 9/2008 | Malarky et al. |
| 2009/0092072 A1 | 4/2009 | Imamura et al. |
| 2009/0209277 A1 | 8/2009 | Pinchas et al. |
| 2009/0219912 A1 | 9/2009 | Wengerter et al. |
| 2009/0295485 A1 | 12/2009 | Mitchell |
| 2009/0296663 A1 | 12/2009 | Wild |
| 2010/0085236 A1* | 4/2010 | Franceschini ......... G01S 13/765 342/30 |
| 2010/0172299 A1 | 7/2010 | Fischer et al. |
| 2010/0224732 A1 | 9/2010 | Olson et al. |
| 2010/0273504 A1 | 10/2010 | Bull et al. |
| 2010/0284377 A1 | 11/2010 | Wei et al. |
| 2010/0290412 A1 | 11/2010 | Ahn et al. |
| 2011/0032149 A1 | 2/2011 | Leabman |
| 2011/0103293 A1 | 5/2011 | Gale et al. |
| 2011/0122024 A1 | 5/2011 | Eidloth et al. |
| 2011/0142150 A1 | 6/2011 | Anigstein et al. |
| 2011/0182230 A1 | 7/2011 | Ohm et al. |
| 2011/0286325 A1 | 11/2011 | Jalali et al. |
| 2011/0286372 A1 | 11/2011 | Taghavi et al. |
| 2012/0052828 A1 | 3/2012 | Kamel et al. |
| 2012/0119953 A1 | 5/2012 | Hosoya et al. |
| 2012/0150364 A1 | 6/2012 | Tillotson et al. |
| 2012/0202430 A1 | 8/2012 | Jalali et al. |
| 2012/0235863 A1 | 9/2012 | Erdos et al. |
| 2013/0040655 A1 | 2/2013 | Keidar |
| 2013/0070677 A1 | 3/2013 | Chang |
| 2013/0109299 A1 | 5/2013 | Roos et al. |
| 2013/0155847 A1 | 6/2013 | Li et al. |
| 2013/0156021 A1 | 6/2013 | Ashikhmin et al. |
| 2013/0303080 A1 | 11/2013 | Moreno |
| 2013/0321204 A1* | 12/2013 | Zahavi .................. H01Q 3/08 342/368 |
| 2013/0331026 A1 | 12/2013 | O'Neill et al. |
| 2014/0003302 A1 | 1/2014 | Han et al. |
| 2014/0003394 A1 | 1/2014 | Rubin et al. |
| 2014/0049643 A1 | 2/2014 | Segerstrom et al. |
| 2014/0073337 A1 | 3/2014 | Hong et al. |
| 2014/0105054 A1 | 4/2014 | Sägrov et al. |
| 2014/0139372 A1 | 5/2014 | Seol et al. |
| 2014/0241239 A1 | 8/2014 | Chang |
| 2014/0335817 A1 | 11/2014 | Hyde et al. |
| 2014/0347223 A1 | 11/2014 | Hyde et al. |
| 2014/0348140 A1 | 11/2014 | Atkinson |
| 2015/0142966 A1 | 5/2015 | Baran et al. |
| 2015/0236778 A1* | 8/2015 | Jalali .................... H04W 84/06 370/316 |
| 2015/0236779 A1 | 8/2015 | Jalali |
| 2015/0236780 A1 | 8/2015 | Jalali |
| 2015/0236781 A1 | 8/2015 | Jalali |
| 2015/0237569 A1 | 8/2015 | Jalali |
| 2015/0280812 A1 | 10/2015 | Jalali |
| 2015/0301529 A1 | 10/2015 | Pillai et al. |
| 2015/0304885 A1 | 10/2015 | Jalali et al. |
| 2015/0362917 A1 | 12/2015 | Wang et al. |
| 2016/0013858 A1* | 1/2016 | Jalali ................... H04B 7/2041 370/318 |
| 2016/0088498 A1* | 3/2016 | Sharawi ................ G01R 29/10 370/241 |
| 2016/0112116 A1 | 4/2016 | Jalali et al. |
| 2016/0134358 A1* | 5/2016 | Jalali ................. H04B 7/18504 455/11.1 |
| 2016/0337027 A1 | 11/2016 | Jalali |
| 2017/0033458 A1* | 2/2017 | Haziza .................. H01Q 3/34 |
| 2017/0156097 A1 | 6/2017 | Weber et al. |

FOREIGN PATENT DOCUMENTS

| | | |
|---|---|---|
| EP | 2801838 A1 | 11/2014 |
| JP | 56141979 A | 2/1986 |
| WO | WO-2014007873 A2 | 1/2014 |

OTHER PUBLICATIONS

Goldsmith AJ., et al., "Design Challenges for Energy-Constrained Ad Hoc Wireless Networks," Wireless Communications, IEEE, 2002, vol. 9 (4), pp. 8-27.

* cited by examiner

GROUND TERMINAL AND GATEWAY BEAM POINTING TOWARD AN UNMANNED AERIAL VEHICLE (UAV) FOR NETWORK ACCESS

PRIORITY APPLICATIONS

This application is a continuation of and claims priority to co-owned U.S. patent application Ser. No. 14/711,427 entitled "GROUND TERMINAL AND GATEWAY BEAM POINTING TOWARD AN UNMANNED AERIAL VEHICLE (UAV) FOR NETWORK ACCESS", filed May 13, 2015, issuing as U.S. Pat. No. 9,590,720 on Mar. 7, 2017, which is incorporated herein by reference in its entirety.

RELATED APPLICATIONS

This application is related to co-owned, co-pending U.S. patent application Ser. No. 14/626,698, entitled "BEAM FORMING AND POINTING IN A NETWORK OF UNMANNED AERIAL VEHICLES (UAVS) FOR BROADBAND ACCESS", filed on Feb. 19, 2015, co-owned, co-pending U.S. patent application Ser. No. 14/516,491, entitled "UNMANNED AERIAL VEHICLE (UAV) BEAM FORMING AND POINTING TOWARD GROUND COVERAGE AREA CELLS FOR BROADBAND ACCESS", filed on Oct. 16, 2014, co-owned, co-pending U.S. patent application Ser. No. 14/486,916, entitled "ANTENNA BEAM MANAGEMENT AND GATEWAY DESIGN FOR BROADBAND ACCESS USING UNMANNED AERIAL VEHICLE (UAV) PLATFORMS", filed on Sep. 15, 2014, co-owned, co-pending U.S. patent application Ser. No. 14/295,160, entitled "METHODS AND APPARATUS FOR MITIGATING FADING IN A BROADBAND ACCESS SYSTEM USING DRONE/UAV PLATFORMS", filed on Jun. 3, 2014, co-owned, co-pending U.S. patent application Ser. No. 14/222,497, entitled "BROADBAND ACCESS TO MOBILE PLATFORMS USING DRONE/UAV", filed on Mar. 21, 2014, and co-owned, co-pending U.S. patent application Ser. No. 14/223,705, entitled "BROADBAND ACCESS SYSTEM VIA DRONE/UAV", filed on Mar. 24, 2014, each of the foregoing incorporated by reference herein in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure describes aspects of a system for broadband internet access using unmanned aerial vehicles (UAVs) to relay internet traffic among different types of terminals. The present disclosure describes systems and methods for optimally pointing the beams of a UAV toward the coverage area on the ground (including ground terminals) as well as pointing the ground terminal beam toward the UAV, and adjusting the ground terminal and UAV beams based on the UAV's altitude, movements, and motions (such as rolling and/or pitching).

2. Description of Related Technology

As internet traffic has increased, new technologies are needed to deliver broadband access to homes and enterprises at lower cost and to places that are not yet covered. Examples of current broadband delivery systems include terrestrial wired networks such as DSL (Digital Subscriber Line) on twisted pair, fiber delivery systems such as FiOS (Fiber Optic Service), and geo-stationary satellite systems. The current broadband access systems have a number of short comings. One issue is that there is a lack of service provided to remote and/or lightly populated areas. Geo-stationary satellites do provide service in remote areas of the developed world such as the United States. However, poorer areas of the world lack adequate satellite capacity.

A notable reason satellite capacity has not been adequately provided in poorer regions of the world is the relatively high cost of satellite systems. Due to adverse atmospheric effects in satellite orbits, satellite hardware must be space qualified and is costly. Launch vehicles to put the satellites in orbit are also costly. Moreover, due to the launch risk and the high cost of satellites, there may be significant insurance costs for the satellite and the launch. Therefore, broadband satellite systems and services are relatively costly and difficult to justify, particularly in poorer regions of the world. It is also costly to deploy terrestrial systems such as fiber or microwave links in lightly populated regions. The small density of subscribers does not justify the deployment cost.

Hence what are needed are improved methods and apparatus for providing broadband access to consumers. Ideally such methods and apparatus would rely on an inexpensive technology which avoids costs associated with launching and maintaining satellites.

SUMMARY

The present disclosure describes, inter alia, systems and methods for optimally pointing the beams of the ground terminal and ground gateways toward the UAV, and adjusting the ground terminal and gateway beams toward the UAV based on the UAV's altitude, movements, and motions (such as roll/pitch).

In one aspect, a communications system for operating an unmanned aerial vehicle (UAV) apparatus is disclosed. In one exemplary embodiment, the communications system includes: a UAV apparatus comprising a UAV radio apparatus configured to: steer one or more UAV beams toward a specific location on a ground location; and receive one or more terminal antenna beams from the ground location. In one exemplary embodiment, the communications system includes: a ground terminal comprising a ground antenna apparatus configured to: form the one or more terminal antenna beams; and steer the one or more terminal antenna beams toward the UAV apparatus.

In one variant, the ground antenna apparatus is manually pointed toward an estimated location of the UAV apparatus at installation, and where the ground antenna apparatus is further configured to automatically track the UAV apparatus.

In another variant, the one or more terminal antenna beams are steered toward the UAV apparatus in real-time, based at least in part on known position information of the UAV apparatus.

In one variant, the ground terminal is configured to identify a two-dimensional target area proximate to the UAV apparatus, the two-dimensional target area comprising a plurality of search bins each having a substantially equal area. In one such variant, the ground antenna apparatus is further configured to: steer at least one of the one or more terminal antenna beams toward a center of each one of the plurality of search bins of the two-dimensional target area; search for a reference signal transmitted by the UAV apparatus; and when the reference signal is detected at a particular one of the plurality of search bins, initiate a fine tracking mode. In one such case, the center of each one of the plurality of search bins is characterized by an azimuthal and/or elevation angle with respect to the ground antenna apparatus. In another variant, a second plurality of search bins are defined proximate to the particular one of the plurality of search bins; and the ground antenna apparatus is further configured to: steer the at least one of the one or more terminal antenna beams toward a second center of each of the second plurality of search bins to measure a signal quality metric associated therewith; and fix the at least one of the one or more terminal antenna beams to a final bin of the second plurality of search bins, the final bin being associated with a highest measured signal quality metric. In one particular variant, the signal quality metric comprises a received signal strength of at least one of the one or more UAV beams.

In one variant, the UAV radio apparatus is configured to steer the one or more UAV beams using at least a two-axis mechanical capability.

In another variant, the UAV radio apparatus is configured to steer the one or more UAV beams using at least a one-axis mechanical capability and a one-axis beam electronic forming capability.

In one aspect, a method of detecting an unmanned aerial vehicle (UAV) apparatus using a ground terminal apparatus is disclosed. In one embodiment, the method includes: pointing a ground antenna toward an estimated location of the UAV apparatus; defining a current bin around an area corresponding to estimated location; defining a first plurality of search bins proximate to the current bin; and searching each of the first plurality of search bins until a reference signal from the UAV apparatus is detected at one of the first plurality of search bins.

In one variant, a target region is disposed around the current bin, the target region being divided into the first plurality of search bins. For example, a target region may be defined by a range of azimuthal and elevation angles.

In one variant, the first plurality of search bins and the current bin each comprise a two-dimensional area having substantially equal sizes.

In another variant, a position of the UAV apparatus is estimated based on real-time position coordinates of the UAV apparatus.

In some variants, the searching comprises pointing a beam originating from the ground terminal antenna, the beam being sequentially pointed toward each of the first plurality of search bins until the reference signal is detected within one of the first plurality of search bins. In one such case, the method may also define a second current bin at the one of the first plurality of search bins where the detected reference signal from the UAV apparatus was detected. Additionally, the method may include: defining a second plurality of search bins around the second current bin; pointing the ground antenna toward a center corresponding to each one of the second plurality of search bins; measuring a signal quality metric associated with each of the second plurality of search bins; determining a third current bin having a highest measured signal quality metric; and fixing the beam originating from the ground terminal antenna on the third current bin. In some cases, a first number of bins within the second plurality of search bins is smaller than a second number of bins within the first plurality of search bins. In other cases, the method includes: periodically updating a time counter; when the time counter crosses a threshold: determining a new current bin having the highest measured signal quality metric; fixing the beam originating from the ground terminal antenna on the new current bin; and resetting the time counter; and when the time counter has not crossed the threshold, continuing to fix the beam originating from the ground terminal antenna on the third current bin.

In another aspect, a method of detecting an unmanned aerial vehicle (UAV) apparatus using a ground terminal apparatus is disclosed. In one embodiment, the method includes: pointing a ground terminal antenna toward an estimated location of the UAV apparatus based on at least partially known real-time position information of the UAV apparatus; defining a current bin based on the estimated location; defining a plurality of search bins around the current bin; and searching each one of the plurality of search bins until a reference signal from the UAV apparatus is detected within at least one of the plurality of search bins.

In one variant, the searching the plurality of search bins comprises forming a beam from the ground terminal antenna toward a center of each of the plurality of search bins.

In another variant, the at least partially known real-time position information of the UAV apparatus is periodically obtained via the UAV apparatus.

These and other aspects shall become apparent when considered in light of the disclosure provided herein.

BRIEF DESCRIPTION OF THE DRAWINGS

In the following figures, where appropriate, similar components are identified using the same reference label.

All Figures © Copyright 2015 Ubiqomm, LLC. All rights reserved.

DETAILED DESCRIPTION

The present disclosure describes aspects of a system designed to provide broadband access.

As used herein, the aerial platforms to which the embodiments of the present disclosure refer generally and without limitation to: drones, unmanned aerial vehicle (UAV), balloons, blimps, airships, etc. The aerial platforms may comprise propulsion systems, fuel systems, and onboard navigational and control systems. In one exemplary embodiment, the aerial platform comprises a fixed wing fuselage in combination with a propeller, etc. In other embodiments, the aerial platform comprises a robocopter, propelled by a rotor. The aerial platform may carry fuel onboard or function using electrical (e.g., battery powered) and/or solar energy. In the remainder of the present disclosure, the terms "aerial platform" and "UAV" refer to any of the abovementioned platforms such as drones, balloons, blimps, airships, etc. Conversely, reference to UAVs, drones, balloons, blimps, airships, etc. in the present disclosure can refer to aerial platforms in general or any other type of aerial platforms.

Figure 1:
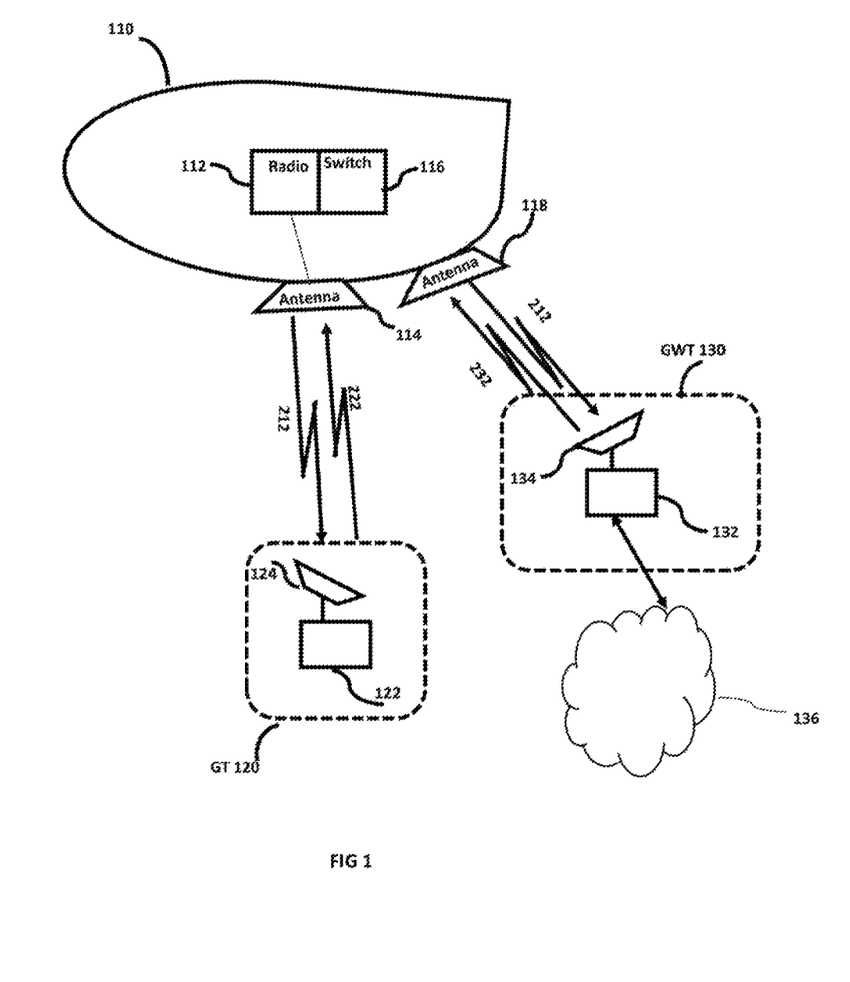
FIG. 1 is a graphical depiction of an exemplary aerial platform based communications system useful in conjunction with various embodiments described herein.

FIG. 1 shows one exemplary embodiment of an unmanned aerial vehicle (UAV) 110. UAVs communicate with at least two kinds of ground terminals: one type is the user Ground Terminal (GT) 120, such as terminals at home or enterprises to provide network connectivity to home or enterprise (e.g., over the Internet); a second type is referred to as the Internet Gateway (GTW) 130 which is connected to the Internet, e.g., GT 120. Note that embodiments described below apply to fixed terminals and devices on the ground, mobile terminals and devices attached to platforms such as vehicles, boats, ship, airplanes, trucks, etc., and standalone mobile devices (e.g., handheld devices, etc.). The term "device" as used hereinafter may broadly encompass any of the aforementioned platforms (e.g., the drone or UAV 110, the GT 120, and/or the GTW 130). As shown, the exemplary UAV 110 has a drone radio sub-system 112, a message switch sub-system 116, and at least one drone antenna aperture sub-system 114 to provide coverage to the ground terminals 120, and at least one drone antenna 118 to provide coverage to the gateway terminals 130. During operation, the UAV is configured to cruise or patrol an "orbit", and provide connectivity between the GT 120, other ground terminals and/or GTW terminals 130. The GTWs 130 may be connected to broader Internet networks 136 via a gateway radio sub-system 132 and signals 212 and/or 232, thereby allowing the GT 120 Internet access and/or access to other GT or GTW.

Figure 2A:
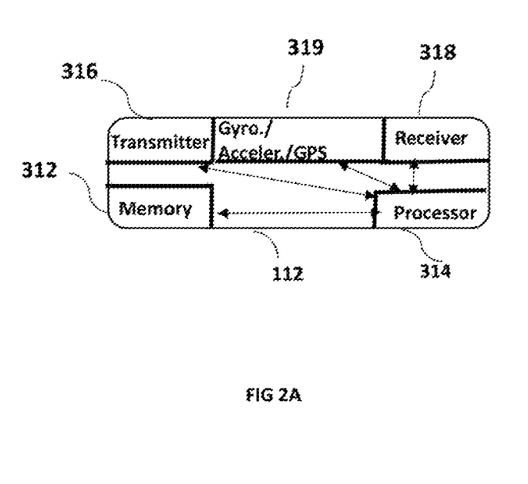
FIG. 2A is a graphical depiction of exemplary radio equipment of an aerial platform useful in conjunction with various embodiments described herein.

FIG. 2A illustrates one exemplary embodiment of an unmanned aerial vehicle (UAV) radio sub-system 112 that includes five (5) sub-systems: (i) a receiver 318 that is configured to demodulate and decode a signal received from a drone antenna aperture sub-system 114; a transmitter 316 that is configured to modulate data received from a processor 314 and send the resulting signal through the drone antenna aperture sub-system 114; a processor sub-system 314 that is configured to carry out functions such as: (i) configuring the receiver 318 and transmitter 316 sub-systems, (ii) processing the data received from the receiver 318 sub-system, (iii) determining the data to be transmitted through the transmitter sub-system 316, and (iv) controlling the antenna sub-system 114; a non-transitory computer readable memory sub-system 312 that is configured to store one or more program code instructions, data, and/or configurations, and system parameter information that accessed by the processor 314; and (v) a gyroscope/accelerometer/global positioning system (GPS) sub-system 319 that is configured to determine a position and orientation of the UAV such as roll or pitch angles.

Depending on the altitude of the UAV, each UAV covers an area on the ground; in one embodiment the area covered has a radius of as low as a few tens of kilometers (km) to as much as 200 km or more. GTs 120 transmit and receive data from the Internet using the UAV 110 as intermediary to the GTW 130. The UAV's radio sub-system aggregates traffic received from the GTs within the coverage area of the UAV of a population of GTs (in some implementations the UAV may aggregate traffic from as many as all GTs and as few as one GT) and sends the aggregated data to the Internet via one or more of the GTWs. Since the GTWs handle aggregated data from multiple GTs, practical implementations of the present disclosure may support higher data rates between the UAV and the GTW, than between the UAV and the GT. Accordingly, in one embodiment the gain of the GTW antenna sub-system is much larger than that of the GT, and the GTW transmitter transmits at higher power than the GTs. Those of ordinary skill in the related arts will readily appreciate the wide variety of techniques which may be used to increase gain, including without limitation, increasing transmit and receive power, increasing bandwidth, increasing processing gain, increasing coding gain, etc.

Figure 2B:
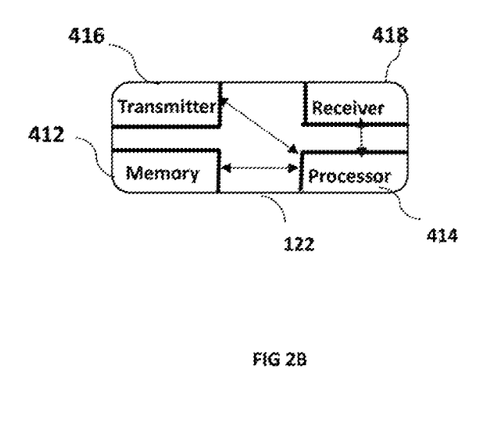
FIG. 2B is a graphical depiction of exemplary radio equipment of a ground terminal useful in conjunction with various embodiments described herein.

Referring back to the embodiment of FIG. 1, the GT 120 has two main sub-systems: a ground terminal radio sub-system 122, and a ground terminal antenna sub-system 124. As shown in FIG. 2B, the GT radio sub-system 122 comprises 4 sub-systems: (i) the receiver 418 that demodulates and decodes the signal from the drone antenna sub-system; (ii) the transmitter sub-system 416 that modulates the data and sends the resulting signal 222 through the antenna sub-system 124; (iii) the processor sub-system 414 that carries out functions such as: configuring the receiver 418 and transmitter 416 sub-systems, processing the data received from the receiver 418 sub-system, determining the data to be transmitted through the transmitter sub-system 416, as well as controlling the antenna sub-system 124; and (iv) the memory sub-system 412 that contains program code, configuration data, and system parameters information that are accessed by the processor 414.

Figure 3:
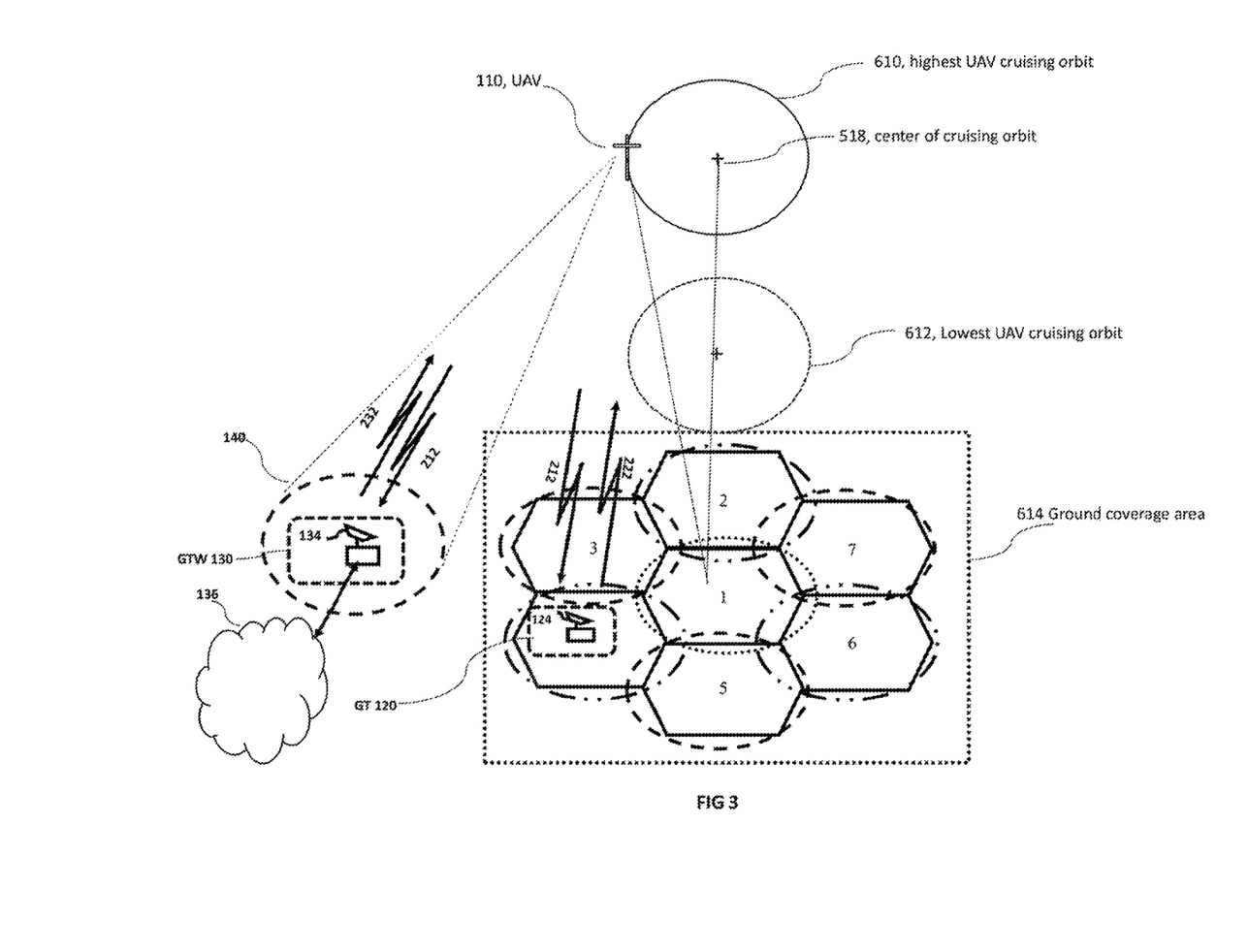
FIG. 3 is a graphical depiction of an exemplary cruising area of the aerial platform/UAV and the related coverage areas on the ground.

Referring now to FIG. 3, the desired target coverage area 614 where terminals 120 are served on the ground is divided into a number of cells; one such exemplary division is shown as an arrangement of seven (7) hexagonal cells. The aerial platform forms beams to cover each cell on the ground in its target coverage area. As shown, the UAV generates seven (7) beams corresponding respectively to the hexagonal cells; e.g., one (1) "central beam" and one (1) ring of beams around the central beam, on the ground. The hexagonal areas represent the ideal coverage area of each beam. In reality, the beams overlap as shown by the different types of dashed circles (i.e., dot, dash, and dot-dash). In this exemplary diagram, the available frequency bandwidth is divided into three (3) bands (F1, F2 and F3), which are assigned to each beam in such a way that no two neighboring beams use the same frequency. The three (3) different dotted circle types indicate beams that use different frequency bands. The foregoing frequency allocation scheme is described as having a "frequency reuse" of three (3). Those of ordinary skill in the related arts, given the contents of the present disclosure, will readily appreciate that other frequency reuse schemes and/or cell divisions may be interchangeably used with equal success.

In addition, FIG. 3 shows one central beam and one ring of beams surrounding the central beam. Additional rings of beams may be added around existing ring(s) to increase the total number of beams. For example, adding a second ring of beams consisting of 12 beams would increase the total number of beams to 19 (7 existing+12 from the second ring). Similarly, adding a third ring of beams consisting of 18 beams around the second ring would increase the total number of beams to 37.

Aerial platforms such as UAVs cruise/patrol in a three dimensional space (e.g., latitude, longitude, and altitude). The position of the aerial platform/UAV with respect to the terminals on the ground changes as the aerial platform/UAV moves horizontally and vertically within its cruising orbit.

FIG. 3 further illustrates an exemplary cruising area of the aerial platform. The top solid circle 610 shows the cruising orbit of the aerial platform/UAV when the platform is at its highest possible altitude. The lower dotted circle 612 shows the cruising orbit when the platform is at its lowest cruising altitude. During normal operation, the aerial platform cruises within an orbit at a particular altitude, e.g., as shown by circles 610 or 612 which are centered around a point 518. Over time, however, the aerial platform may move vertically up or down depending on time of day. For instance, solar powered drones may need to run on battery power at night. To conserve energy, the drone may reduce its altitude, e.g., from one altitude to an altitude corresponding to lower circle 612.

Two types of terminals are further illustrated in FIG. 3. GT 120, installed at homes or enterprises (or other stations such as vehicles as noted supra), and referred to as ground terminals, send and receive data from the Internet 136 (or other wirelessly accessible network) via UAV 110. Only one of the terminals 120 is shown in the figure for purposes of clarity. UAV 110 in turn connects to the Internet 136 via gateway GTW 130. Ground terminals 120 are located within the coverage area provided by beams 1 through 7. Beams 1 through 7 provide coverage to terminals 120 and are referred to as the GT beams. Since the gateway 130 may be located farther from the UAV than the ground terminals are, the gateway 130 may be outside of the coverage area of the GT beams 1 through 7. Therefore, the physical arrangement of gateway 130 and terminals 120 as shown in FIG. 3 requires a separate beam 140 formed by UAV 110 and pointed toward the location of gateway 130. An advantage of the arrangement as shown is that the terminals 120 may be farther apart than the conventional distance used by, for example, the infrastructure of existing Internet service providers. Moreover, gateway 130 and ground terminals 120 being physically disconnected may contribute to reducing the cost of providing connectivity to consumers, as is an objective of the present disclosure.

In one embodiment, the GT beams are static in the sense that as the UAV moves in its cruising orbit formed by a cylinder between circular orbits 610 and 612 in FIG. 3, the GT beams move on the ground, following the movement of the UAV. In other words, the UAV GT beam antenna sub-system may not adjust the GT beams to stay fixed on specific locations on the ground. As a first GT beam moves over a terminal 120 and a second GT beam starts to cover terminal 120, terminal 120 is handed over from the first GT beam to the second GT beam.

In the case of beam 140, referred to as the UAV Gateway beam, the UAV radio sub-systems points the UAV Gateway beam 140 to the gateway 130 using knowledge of position coordinates of the gateway 130 as well as real-time position coordinates and orientation of the UAV. In one embodiment, the real-time position coordinates and orientation of the UAV are computed by the gyroscope/accelerometer/GPS sub-system 319 of the UAV radio sub-system 112 shown in FIG. 2A. Therefore, as the UAV moves in its cruising orbit, the UAV real-time position coordinates and orientation angles are used to continuously repoint the UAV Gateway beam 140 toward gateway 130. That is, the UAV gateway antenna sub-system 118 adjusts the UAV Gateway beam 140 to stay relatively fixed on specific locations on the ground, in this case the gateway 130.

In one embodiment of the present disclosure, the UAV gateway antenna sub-system 118 shown in FIG. 1 illustrates a two axis mechanical antenna beam steering capability; the UAV radio sub-system 112 instructs the UAV gateway antenna sub-system 118 to adjust its antenna beam pointing angle on two axes using information on real-time position coordinates and orientation angle of UAV 110. In another embodiment of the present disclosure, the UAV gateway antenna 118 comprises of at least one axis mechanical beam steering capability and at least one axis electronic beam forming capability, used in steering the UAV gateway antenna beam toward gateway 130.

Next, systems and methods are described for pointing the ground terminal 120 antenna 124 beam and ground gateway antenna 134 beam toward the UAV at the initial ground terminal and ground gateway installation, as well as continuous optimal steering of the ground terminal and gateway antennas toward the UAV to track the UAV movements. Since the processes of pointing the ground antennas toward the UAV at initial installation and continuous optimal steering of the antennas toward the UAV are the same for the ground terminals 120 and ground gateways 130, both types of terminals simplify may be referred to as a "terminal." In particular, the embodiments described below apply to both ground terminals 120 and ground gateways 130.

Since terminal 120 antenna beam may have a narrow beamwidth, as the UAV moves in its cruising orbit, the terminal's antenna beam may not cover the UAV unless the terminal's antenna beam is either mechanically or electronically steered to track the position of the UAV. In particular, when the terminal is initially installed, the terminal's antenna must be pointed toward the UAV in such a way that the terminal's beam covers the UAV. One embodiment of the present disclosure describes systems and methods to point the terminal antenna beam toward the UAV at the time of terminal installation. One approach to pointing the terminal antenna is to use information on the position (e.g., coordinates) or location (e.g., relative or absolute) of the UAV. If the real-time position coordinates of the terminal and the UAV are known, then an installer may manually point the antenna toward the UAV.

In another embodiment, schemes fully or at least partially automate the process of pointing the terminal beam toward the UAV at terminal installation time. One variant assumes that real-time position coordinates of the UAV are known to the installer at installation time. Referring again to FIG. 3, initially the UAV terminal antenna 124 is manually pointed in the general direction of the UAV 110 based on information on the approximate UAV position or location. The real-time UAV position coordinates are entered into the terminal's antenna sub-system to improve accuracy, in one variant. The terminal antenna sub-system uses the real-time UAV position coordinates to point the terminal antenna toward the UAV. Following the pointing of the terminal antenna beam toward the UAV at initial installation, the terminal antenna sub-system tracks UAV position, once the terminal antenna beam beamwidth is narrower than the UAV cruising orbit. Once the terminal 120 and UAV 110 establish a connection, the UAV 110 may periodically send its real-time position coordinates to the terminal 120. The terminal antenna sub-system 124 uses the updated UAV position coordinates to adjust the terminal's antenna beam toward the UAV.

In another embodiment of the initial calibration to point the terminal antenna beam toward the UAV, the terminal does not have access to accurate information regarding the real-time position or location of the UAV at the time of terminal installation. Once the UAV terminal antenna is pointed in the general direction of the UAV, then the terminal antenna sub-system follows the two phases of (1) UAV signal detection and (2) UAV position tracking to accurately point the terminal antenna beam toward the UAV. During the UAV detection phase, the terminal antenna beam is iteratively steered toward the UAV in relatively large incremental azimuthal and/or elevation angles in order to detect a reference signal sent by the UAV. As a brief aside, those of ordinary skill in the related arts will readily appreciate that the ground terminal (and/or the UAV) is not perfectly aligned for reception where the antennas are only proximately aligned (e.g., to within a few degrees of accuracy, etc.); for example, alignment may be performed to a tolerable percentage of reception strength, etc. Thereafter, the ground terminal (and/or UAV) must further fine tune the alignment to maximize reception strength. Consequently, once the terminal detects a reference signal sent by the UAV, then the terminal antenna sub-system moves to the fine UAV position tracking phase where the terminal's antenna beam is iteratively steered in smaller incremental azimuthal and/or elevation angles toward the UAV to find the terminal antenna beam position toward the UAV with highest performance signal quality measure such as the received signal strength (RSS). The coarse UAV detection phase and the fine UAV position tracking phase are described in further detail herein.

In one exemplary embodiment, the ground terminal includes a two axis mechanical antenna beam steering mechanism. In one such variant the two axis are configured for manipulating the azimuthal and/or elevation angle of the boresight. In another embodiment of the present disclosure, the ground terminal includes at least one axis of mechanical beam steering capability and at least one axis of electronic beam forming capability, for use in steering the antenna beam toward the UAV.

Figure 4:
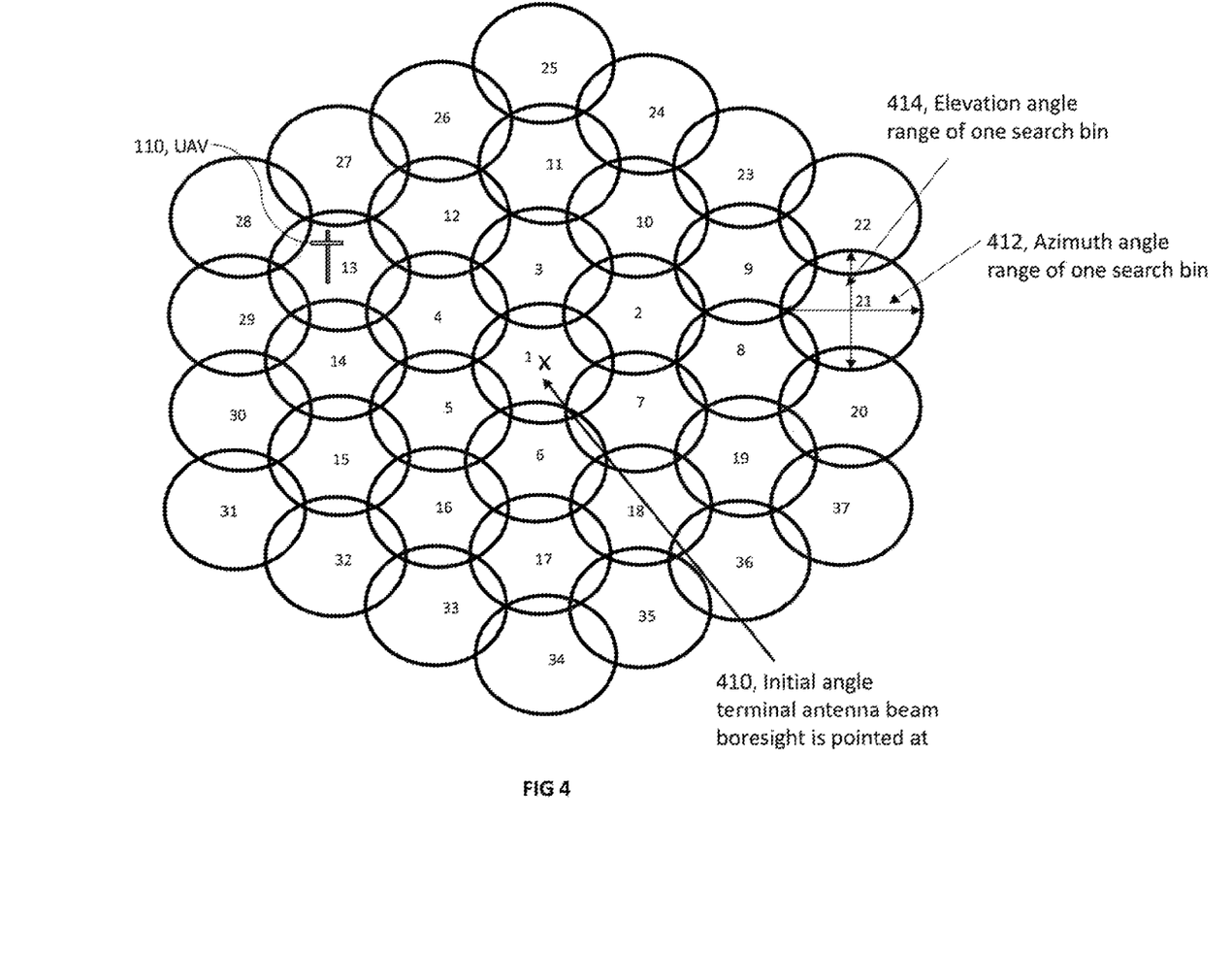
FIG. 4 is a diagram of UAV position and terminal antenna beam angular search bins during a coarse UAV detection by ground terminal.

Referring now to FIG. 4, during the coarse UAV detection phase, the two-dimensional azimuthal and/or elevation terminal antenna beam angle search space is divided into a discrete number of beam pointing angular bins, each with its own azimuthal and elevation angle ranges 412, 414. For purposes of clarity, hexagonal cell boundaries as previously shown in FIG. 3 are not shown in the coverage area of FIG. 4. FIG. 4 shows the position of the UAV 110 as well as the angular position 410 at which the terminal beam boresight is pointing after the initial terminal antenna general beam pointing procedure described above. Since, during the UAV detection phase, the objective is for the terminal radio sub-system to be able to detect the reference signal from the UAV, and not necessarily send data at high rates, the terminal receiver can tolerate a loss of as much as 10 dB of antenna gain due to inaccurate (coarse) antenna pointing yet still detect the reference signal from the UAV. Therefore, the angular search bin may be as large as that of the 10 dB beamwidth of the terminal antenna beam in the azimuth and elevation angles. Note that the 10 dB beamwidth of the antenna beam is defined as the azimuth or elevation angle width from the beam's boresight where the antenna gain is within 10 dB of the peak gain.

Next is an example of how the number of terminal antenna beam angular search bins is determined during UAV detection phase. Suppose the 10 dB beamwidth of the terminal antenna beam is +/−10 degrees from the beam boresight. If, as an example, the approximate knowledge of the UAV position is within 100 (+/−50) degrees of elevation angle and 100 degrees of azimuth angle from the UAV terminal's current beam pointing angle, then the 100 degree elevation and azimuth search space may be divided into at least 5 angular search bins of 20 degrees each, resulting in 5×5=25 two-dimensional "circular angular" search bins. However, since the search bins are circular angular bins, some overlapping between different search bins occurs.

FIG. 4 further illustrates an exemplary thirty-seven (37) angular search bins covering an angular region of 100 degrees in azimuth and 100 degrees in elevation according to the aforementioned example. As shown, the UAV 110 is in bin 13 relative to the angular bin at which the terminal antenna beam is initially pointed. The different angular search bins each correspond to the angular position where the antenna is initially pointed. In other words, the center of the angular search bin in the center of the search bin layout is the initial position of the antenna. In each terminal antenna angular search bin (e.g., bins 1 through 37 in FIG. 4), the terminal radio sub-system points the terminal beam toward the center of the bin and searches for a reference signal 212 (see FIG. 3) sent by UAV on the frequency channels used on the different GT beams (e.g., F1, F2 and F3 as described supra) until the reference signal is detected on one of the frequency channels. If after a certain time period the reference signal is not detected in a given angular search bin, then the antenna is instructed to point its beam's boresight to the center of a different angular search bin, and the terminal antenna beam remains in the new position for a time period where the UAV terminal may detect the reference signal if the terminal antenna is pointing toward the UAV. This procedure of changing the terminal antenna beam pointing angle toward the center of the specified angular search bins continues until the reference signal sent by the UAV is detected.

Figure 5:
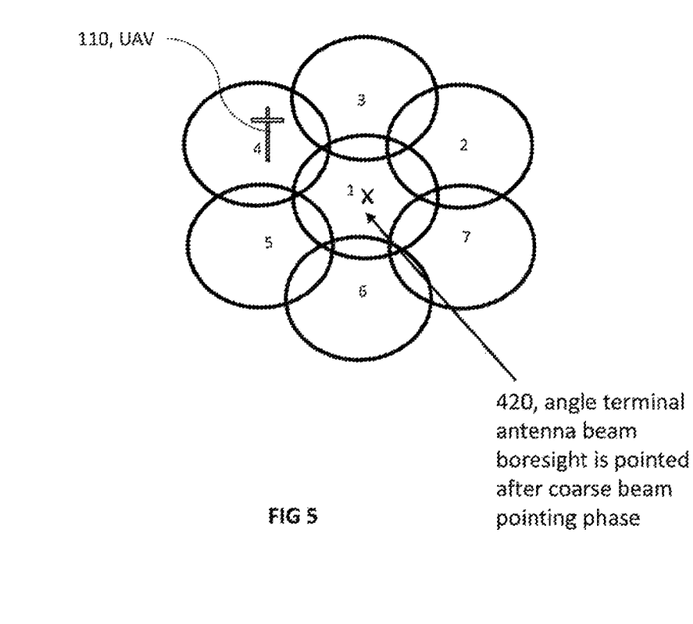
FIG. 5 is a diagram of UAV position and terminal antenna beam angular search bins during a fine UAV position tracking phase by ground terminal.

Once the reference signal is detected in the coarse UAV detection phase, then the terminal antenna beam pointing moves into the fine UAV position tracking phase (as shown in FIG. 5). During the fine UAV position tracking phase, angular search bins (e.g., bins 2 through 7) are defined around the angular position 420 at which the terminal antenna beam is pointing at the conclusion of the UAV detection phase. The "current search bin" is defined around this angular position 420. Bin 1 in FIG. 5 is shown as the current search bin where the terminal antenna beam is pointing. The terminal beam elevation and azimuth angular search bin sizes during fine UAV position tracking may be as low as only 2 degrees or less; more directly, during fine tracking a much tighter and more accurate bin structure is used. During the fine UAV position tracking phase, the terminal antenna beam points toward the center of the current bin (bin 1), and measures the RSS (received signal strength) or various other well-known signal quality metrics of the received signal from UAV.

Next, the terminal antenna beam is moved to the center of each of the surrounding bins 2 through 7 and the RSS (or an alternative signal quality metric) is measured in each of these bins. The bin with the highest RSS or signal quality from among the seven (7) bins is chosen as the next current angular bin and is marked as bin 1. Then, another six (6) bins are specified surrounding the new current bin. This process of measuring signal quality of the seven (7) search bins and choosing the bin with largest signal quality as the position where the terminal antenna beam points is used to continuously track the position of the UAV. Note that the seven (7) search bins described above is one exemplary illustration of the fine UAV position tracking phase. In other embodiments, fewer or greater number of bins may be defined and used in the fine UAV position tracking phase. Stated differently, during the fine UAV tracking phase, the terminal antenna beam is dithered around the terminal's initial angular pointing position (referred to as current angular bin above), wherein among the current bin and bins adjacent thereto, the bin having the highest received signal quality is chosen as the next current terminal angular search bin.

Methods—

Figure 6:
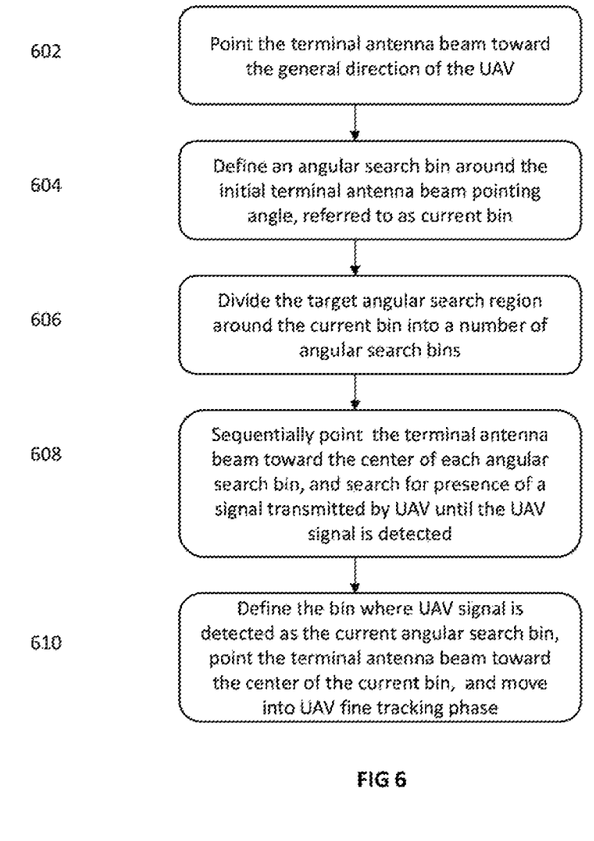
FIG. 6 is an exemplary flow chart of the coarse UAV detection procedure used by ground terminals to adjust their beams toward the UAV to detect a signal sent by the UAV.

Referring now to FIG. 6, a flow chart of an exemplary process used to detect the UAV during the coarse UAV detection phase is shown. In step 602, the terminal antenna beam is pointed toward the general direction of the UAV. In one embodiment, the accurate position or location of the UAV is unknown, and thus the location of UAV is estimated. In another embodiment, at least portions of real-time (i.e., accurate) UAV position coordinates may be known by the terminal's antenna sub-system. Hence, limited information on the position or location of the UAV may be available. In step 604, one angular search bin with certain azimuthal and elevation angles, is referred to as and defined as a "current angular search bin," "current search bin" or a "current bin" based at least on the angular position toward which the terminal antenna is pointing after step 602 (initial pointing of terminal antenna in general UAV direction).

In step 606, a target angular region around the current angular search bin is divided into a number of angular search bins. The target region covers the possible location(s) of the UAV and is where the UAV may reside. The size of each of the divided angular search bins is defined to be ideally the same as that of the current bin to, e.g., enable consistent signal quality measurement. In the exemplary embodiment as discussed above for FIG. 4 for instance, the current bin and the divided angular search bins may comprise bins 1 through 37 of substantially equal sizes. In step 608, the terminal radio sub-system points its antenna beam toward the center of each angular search bin and searches for a reference signal transmitted by the UAV until the UAV signal is detected. The pointing may proceed in a particular sequence, based on a predetermined path or another arrangement. In step 610, the angular search bin where the UAV signal is detected is defined as the current angular search bin and the process is moved to the UAV fine tracking phase.

Figure 7:
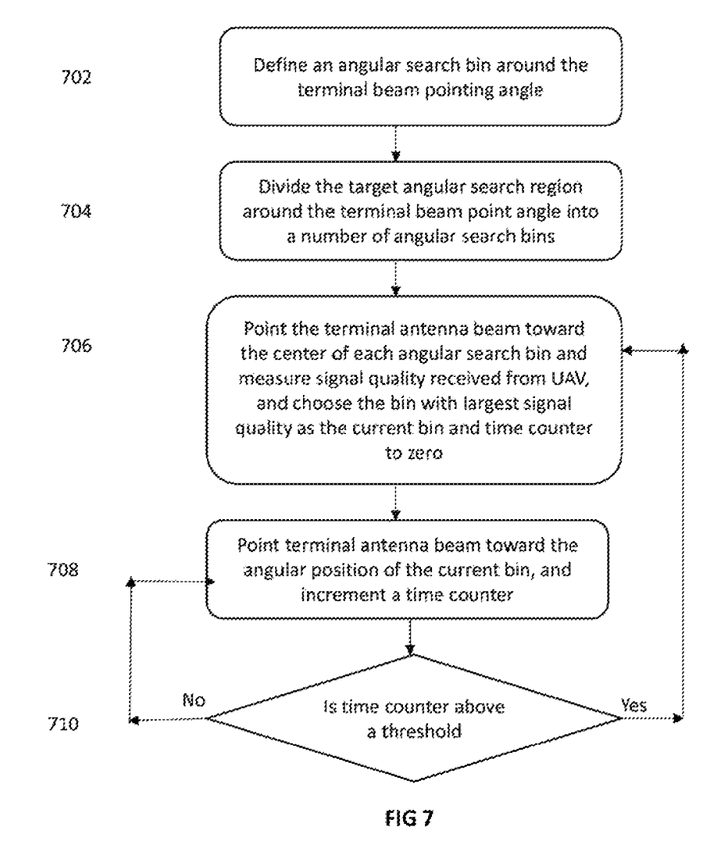
FIG. 7 is an exemplary flow chart of the fine UAV tracking procedure used by ground terminals to accurately position the terminal's antenna beam toward the UAV and to track the UAV movements.

Proceeding to FIG. 7, a flow chart of an exemplary process of the fine UAV tracking phase is shown. The process, as described in further detail below, is used to more accurately steer the terminal antenna beam toward the UAV. In step 702, an angular search bin is defined around the angular position where the terminal antenna beam is pointing at the conclusion of the coarse UAV detection phase. This angular search bin is referred to as the (new) current angular search bin. In step 704, the angular search region around the bin where the UAV was detected during UAV detection phase is divided into a number of new smaller angular search bins for the UAV tracking phase and is configured into a search bin list. For example, the angular search bins may comprise bins 1 through 7 as in the example of FIG. 5.

In step 706, the terminal antenna beam is sequentially pointed toward the center of each angular search bin, UAV signal quality such as RSS or other metrics to measure signal quality is measured in each bin, and the bin with the largest signal quality is again chosen as the new current bin. In step 706, a time counter is initialized to track the time elapsed since choosing the new current bin or remaining until the current angular search bin is updated. In step 708, the terminal antenna beam remains fixed on the current bin angular position (previously determined in step 704) for data communication, and the time counter is adjusted (e.g., incremented or decremented). In step 710, if the time counter is above or below a certain threshold, the process moves again to step 706 to update the current angular search bin by, inter alia, evaluating the bin with the largest signal quality. Otherwise, the process moves to step 708, i.e., the terminal antenna beam remains fixed on the current bin angular position without an update.

In another embodiment of the fine tracking process of the UAV position, once the terminal antenna beam is pointed toward the UAV accurately enough to be able to detect data packets sent by the UAV, then the UAV radio sub-system may periodically send the UAV real-time position coordinates of the UAV to the terminals. The terminal radio sub-system may then steer the terminal's antenna beam toward the UAV's position using the real-time position coordinates of the UAV.

It will be appreciated that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. A communications system for operating an unmanned aerial vehicle (UAV) apparatus, the communications system comprising:
   a UAV apparatus comprising a UAV radio apparatus configured to:
   steer one or more UAV beams toward a specific location on a ground location; and
   receive one or more terminal antenna beams from the ground location; and a ground terminal comprising a ground antenna apparatus configured to:
form the one or more terminal antenna beams; and
steer the one or more terminal antenna beams toward the UAV apparatus;
wherein the ground antenna apparatus is configured to form the one or more terminal antenna beams within a two-dimensional target area proximate to the UAV apparatus, the two-dimensional target area comprising a plurality of search bins each having a substantially equal area.

2. A method of detecting an unmanned aerial vehicle (UAV) apparatus using a ground terminal apparatus, the method comprising:
pointing a ground antenna toward an estimated location of the UAV apparatus;
defining a current bin around an area corresponding to the estimated location of the UAV apparatus;
defining a first plurality of search bins proximate to the current bin; and
searching each of the first plurality of search bins until a reference signal from the UAV apparatus is detected at one of the first plurality of search bins;
wherein the searching comprises pointing a beam originating from the ground terminal antenna, the beam being sequentially pointed toward each of the first plurality of search bins until the reference signal is detected within one of the first plurality of search bins.

3. A method of detecting an unmanned aerial vehicle (UAV) apparatus using a ground terminal apparatus, the method comprising:
pointing a ground terminal antenna toward an estimated location of the UAV apparatus based on at least partially known real-time position information of the UAV apparatus;
defining a current bin based on the estimated location of the UAV apparatus;
defining a plurality of search bins around the current bin;
searching each one of the plurality of search bins until a reference signal from the UAV apparatus is detected within at least one of the plurality of search bins;
wherein the defining of the plurality of search bins comprises forming a two-dimensional target area proximate to the UAV apparatus; and
wherein the forming of the two dimensional target area is characterized by an azimuthal dimension and an elevation dimension.

4. The method of claim 3, wherein the searching of each one of the plurality of search bins comprises searching each bin of the plurality of search bins in sequence.

5. The method of claim 3, wherein the searching of each one of the plurality of search bins further comprises identifying a bin having the highest received signal quality as a next current terminal angular search bin.

6. A method of detecting an unmanned aerial vehicle (UAV) apparatus using a ground terminal apparatus, the method comprising:
pointing a ground terminal antenna toward an estimated location of the UAV apparatus based on at least partially known real-time position information of the UAV apparatus;
defining a current bin based on the estimated location of the UAV apparatus;
defining a plurality of search bins around the current bin;
searching each one of the plurality of search bins until a reference signal from the UAV apparatus is detected within at least one of the plurality of search bins and
further comprising fine tracking the UAV apparatus when the reference signal is detected within the at least one of the plurality of search bins;
wherein the fine tracking of the UAV apparatus comprises dividing the at least one of the plurality of search bins that the reference signal was detected in into a plurality of smaller bins.

* * * * *